United States Patent
McMullin (10) Patent No.: US 8,712,595 B2
(45) Date of Patent: Apr. 29, 2014

(54) DYNAMIC LOAD PROFILING IN A POWER NETWORK

(75) Inventor: Dale Robert McMullin, Canton, GA (US)

(73) Assignee: General Electric Company, Schenectady, NY (US)

( * ) Notice: Subject to any disclaimer, the term of this patent is extended or adjusted under 35 U.S.C. 154(b) by 466 days.

(21) Appl. No.: 13/008,097

(22) Filed: Jan. 18, 2011

(65) Prior Publication Data

US 2012/0185105 A1  Jul. 19, 2012

(51) Int. Cl.
*H02J 7/00* (2006.01)
*G06Q 50/06* (2012.01)

(52) U.S. Cl.
CPC ............... *G06Q 50/06* (2013.01); *Y02T 90/14* (2013.01); *Y02T 10/7005* (2013.01)
USPC ........... 700/291; 700/266; 700/295; 700/297; 320/109; 320/104

(58) Field of Classification Search
None
See application file for complete search history.

(56) References Cited

U.S. PATENT DOCUMENTS

| | | | | |
|---|---|---|---|---|
| 5,274,571 A * | 12/1993 | Hesse et al. | .................... | 700/291 |
| 5,475,609 A * | 12/1995 | Apothaker | ..................... | 700/292 |
| 5,487,002 A | 1/1996 | Diller et al. | | |
| 5,796,628 A * | 8/1998 | Chiang et al. | .................. | 700/295 |
| 6,441,586 B1 | 8/2002 | Tate, Jr. et al. | | |
| 6,980,890 B1 * | 12/2005 | Cassara' et al. | ............... | 700/286 |
| 7,058,522 B2 * | 6/2006 | Chen | .............................. | 702/60 |
| 7,092,798 B2 * | 8/2006 | Mansingh et al. | ............ | 700/292 |
| 7,321,810 B2 * | 1/2008 | Mansingh et al. | ............ | 700/286 |
| 7,444,189 B1 * | 10/2008 | Marhoefer | ....................... | 700/26 |
| 7,688,074 B2 | 3/2010 | Cox et al. | | |
| 7,944,869 B2 * | 5/2011 | Todd et al. | ..................... | 370/311 |
| 7,952,319 B2 * | 5/2011 | Lowenthal et al. | ........... | 320/104 |
| 7,956,570 B2 * | 6/2011 | Lowenthal et al. | ........... | 320/104 |
| 8,019,445 B2 * | 9/2011 | Marhoefer | ....................... | 700/26 |
| 8,051,174 B2 * | 11/2011 | Xiao et al. | ..................... | 709/226 |
| 8,121,740 B2 * | 2/2012 | Yang et al. | .................... | 700/292 |
| 8,126,685 B2 * | 2/2012 | Nasle | ............................ | 700/295 |
| 8,138,715 B2 * | 3/2012 | Lowenthal et al. | ........... | 320/104 |
| 8,315,745 B2 * | 11/2012 | Creed | ............................ | 700/295 |
| 8,483,111 B2 * | 7/2013 | Todd et al. | ..................... | 370/311 |
| 8,493,025 B2 * | 7/2013 | Turner | ........................... | 320/109 |
| 8,594,859 B2 * | 11/2013 | Contreras Delpiano et al. | . | 701/2 |
| 2004/0158360 A1 * | 8/2004 | Garland et al. | ............... | 700/286 |
| 2004/0246643 A1 * | 12/2004 | Chen | ............................. | 361/115 |
| 2004/0257059 A1 * | 12/2004 | Mansingh et al. | .......... | 324/76.11 |
| 2004/0264083 A1 * | 12/2004 | Mansingh et al. | ............... | 361/62 |
| 2009/0045803 A1 * | 2/2009 | Schoettle | ....................... | 700/295 |
| 2009/0048716 A1 * | 2/2009 | Marhoefer | .................... | 700/291 |

(Continued)

OTHER PUBLICATIONS

APS Panel on Public Affairs Committee on Energy and Environment, "Integrating Renewable Electricity on the Grid", Nov. 2010.*

(Continued)

*Primary Examiner* — Mohammad Ali
*Assistant Examiner* — Kelvin Booker
(74) *Attorney, Agent, or Firm* — Cantor Colburn LLP (57) ABSTRACT

A method for dynamic load profiling in a power network can include receiving static load data in the power network, generating a load forecast from the static load data, generating dynamic load data from data related to distributed assets in the power network and modifying the load forecast based on the dynamic load data for profiling the dynamic load data.

14 Claims, 3 Drawing Sheets

(56) References Cited

U.S. PATENT DOCUMENTS

| | | | |
|---|---|---|---|
| 2009/0174365 A1* | 7/2009 | Lowenthal et al. | 320/109 |
| 2009/0242301 A1* | 10/2009 | Mcclanahan et al. | 180/69.6 |
| 2010/0013436 A1* | 1/2010 | Lowenthal et al. | 320/109 |
| 2010/0049610 A1* | 2/2010 | Ambrosio et al. | 706/47 |
| 2010/0076615 A1* | 3/2010 | Daniel et al. | 700/293 |
| 2010/0082277 A1 | 4/2010 | Ballard | |
| 2010/0161151 A1* | 6/2010 | Yang et al. | 700/297 |
| 2010/0211340 A1* | 8/2010 | Lowenthal et al. | 702/63 |
| 2010/0217452 A1* | 8/2010 | McCord et al. | 700/295 |
| 2010/0262308 A1* | 10/2010 | Anderson et al. | 700/287 |
| 2010/0274407 A1* | 10/2010 | Creed | 700/295 |
| 2010/0274656 A1* | 10/2010 | Genschel et al. | 705/14.27 |
| 2011/0004358 A1* | 1/2011 | Pollack et al. | 700/297 |
| 2011/0022434 A1* | 1/2011 | Sun et al. | 705/7 |
| 2011/0029141 A1* | 2/2011 | Sun et al. | 700/291 |
| 2011/0029142 A1* | 2/2011 | Sun et al. | 700/291 |
| 2011/0029147 A1* | 2/2011 | Sun et al. | 700/295 |
| 2011/0035071 A1* | 2/2011 | Sun et al. | 700/291 |
| 2011/0172836 A1* | 7/2011 | Boss et al. | 700/291 |
| 2011/0172837 A1* | 7/2011 | Forbes, Jr. | 700/291 |
| 2011/0204847 A1* | 8/2011 | Turner | 320/109 |
| 2011/0227754 A1* | 9/2011 | Hill | 340/870.01 |
| 2011/0231028 A1* | 9/2011 | Ozog | 700/291 |
| 2011/0258112 A1* | 10/2011 | Eder et al. | 705/39 |
| 2011/0316478 A1* | 12/2011 | Lowenthal et al. | 320/109 |
| 2012/0035778 A1* | 2/2012 | Kong | 700/295 |
| 2012/0078553 A1* | 3/2012 | Kuroda et al. | 702/63 |
| 2012/0083930 A1* | 4/2012 | Ilic et al. | 700/287 |
| 2012/0095830 A1* | 4/2012 | Contreras Delpiano et al. | 700/297 |
| 2012/0106672 A1* | 5/2012 | Shelton et al. | 375/295 |
| 2012/0109401 A1* | 5/2012 | Shelton et al. | 700/297 |
| 2012/0109402 A1* | 5/2012 | Shelton et al. | 700/297 |
| 2012/0109403 A1* | 5/2012 | Shelton et al. | 700/297 |
| 2012/0109797 A1* | 5/2012 | Shelton et al. | 700/297 |
| 2012/0109798 A1* | 5/2012 | Shelton et al. | 705/34 |
| 2012/0130556 A1* | 5/2012 | Marhoefer | 700/291 |
| 2012/0136496 A1* | 5/2012 | Black et al. | 700/291 |
| 2012/0150359 A1* | 6/2012 | Westergaard | 700/291 |
| 2012/0169283 A1* | 7/2012 | Lowenthal et al. | 320/109 |
| 2012/0179625 A1* | 7/2012 | Holmes | 705/338 |
| 2012/0181985 A1* | 7/2012 | Lowenthal et al. | 320/109 |
| 2012/0181986 A1* | 7/2012 | Lowenthal et al. | 320/109 |
| 2012/0249022 A1* | 10/2012 | Washburn et al. | 318/149 |
| 2012/0249068 A1* | 10/2012 | Ishida | 320/109 |
| 2012/0271469 A9* | 10/2012 | Masters et al. | 700/292 |
| 2012/0296482 A1* | 11/2012 | Steven et al. | 700/291 |
| 2012/0310453 A1* | 12/2012 | Brooks et al. | 701/20 |
| 2013/0020992 A1* | 1/2013 | Wu et al. | 320/109 |
| 2013/0076279 A1* | 3/2013 | Abel et al. | 318/139 |
| 2013/0166081 A1* | 6/2013 | Sanders et al. | 700/286 |
| 2013/0204443 A1* | 8/2013 | Steven et al. | 700/286 |
| 2013/0245847 A1* | 9/2013 | Steven et al. | 700/291 |
| 2013/0300362 A1* | 11/2013 | Turner | 320/109 |
| 2013/0346139 A1* | 12/2013 | Steven et al. | 705/7.24 |

OTHER PUBLICATIONS

Blagajac, S.; Krajcar, S. and Skrlec, D., "Simple Power Distribution Load Forecasting Method Based on Fuzzy Modelling", Jul. 2001, 2001 Large Engineering Systems Conference on Power Engineering (LESCOPE 2001).*

Bo, R. and Li, F., "Probabilistic LMP Forecasting Considering Load Uncertainty", Aug. 2009, IEEE Transactions on Power Systems, vol. 24, No. 3.*

Choi, S.-Y.; Kim, J.-B.; Cha, J.-S.; Suh, H.-S.; Lee, J.-S.; Kim, T.-H. and Shin, M.-C., "Service Restoration Considering Load Balancing in Distribution Networks", 2006, Proceedings Volume from the IFAC Symposium on Power Plants and Power Systems Control.*

Costa, M.; Pasero, E.; Piglione, F. and Radasanu, D., "Short Term Load Forecasting Using a Synchronously Operated Recurrent Neural Network", 1999, Proceedings of the International Joint Conference on Neural Networks.*

DNV Kema Inc., "The Virtual Power Plant", 2011, Retrieved from the Internet at "www.dnvkema.com".*

Kintner-Meyer, M.; Nguyen, T.B.; Jin, C.; Balducci, P. and Secrest, T., "Impact Assessment of Plug-in Hybrid Vehicles on the U.S. Power Grid", Nov. 2010, The 25$^{th}$ World Battery, Hybrid and Fuel Cell Vehicle Symposium and Exhibition.*

Qian, K.; Zhou, C.; Allan, M. and Yuan, Yue, "Load Model for Prediction of Electric Vehicle Charging Demand", Oct. 2010, 2010 International Conference on Power System Technology (Powercon).*

Fidalgo, J.N. and Pecas Lopes, J.A., "Load Forecasting Performance Enhancement When Facing Anomalous Events", Feb. 2005, IEEE Transactions on Power Systemems, vol. 20, No. 1.*

Papalexopoulos, A.D.; Hao, S. and Peng, T.-M., "An Implementation of a Neural Network Based Load Forecasting Model for the EMS", Nov. 1994, IEEE Transactions on Power Systems, vol. 9, No. 4.*

Nazarko J. et al. "Application of Statistical and Neutral Approaches to the Daily Load Profiles Modelling in Power Distribution Systems.", New York, NY, Apr. 11, 1999, pp. 320-235.

Search Report and Written Opinion from corresponding EP Application No. 12151324.6, May 25, 2012.

* cited by examiner

DYNAMIC LOAD PROFILING IN A POWER NETWORK

BACKGROUND OF THE INVENTION

The subject matter disclosed herein relates to power distribution and, more particularly, to a system and method for time based or dynamic load profiling and forecasting by predicting and using where dynamic or moving objects will be in a distributed power network.

Traditional power distribution requires a power distributor to know the distribution of assets that require power for given locations (e.g., power grids) based on the volume of assets and a prediction of when power is to be needed (e.g., peak power times). With the advent of plug-in electric vehicles (PEV), such distributed assets are no longer static. Charging stations for PEVs are static locations, but it can be difficult to predict the volume of PEVs and the times of day that a particular charging station will service, which causes a shift of dynamic load that is not accurately forecasted with conventional monitoring technology. There exists no systems that can spatially determine where a particular distributed asset (e.g., a single PEV) will be located at a given time, what kind of load it will require (e.g., a length of charging time) and how it will connect to the network. As more dynamic assets are adopted by consumers and industry, the combined effects will have a great impact on specific areas where concentration is highest at given times of the day. These areas of higher concentration will lead to greater swings in the balance of overall grid stability and power distribution.

BRIEF DESCRIPTION OF THE INVENTION

According to one aspect of the invention, a method for dynamic load profiling in a power network is described. The method can include receiving static load data in the power network, generating a load forecast from the static load data, predicting and generating dynamic load data from data related to distributed assets in the power network and modifying the load forecast based on the dynamic load data for profiling the dynamic load.

According to another aspect of the invention, a computer program product for dynamic load profiling in a power network is described. The computer program product can include a computer readable medium having instructions for causing a computer to implement a method including receiving static load data in the power network, generating a load forecast from the static load data, predicting and generating dynamic load data from data related to distributed assets in the power network and modifying the load forecast based on the dynamic load data for profiling the dynamic load.

According to yet another aspect of the invention, a system for dynamic load profiling in a power network is described. The system can include a processor configured to receive static load data in the power network, generate a load forecast from the static load data, predict and generate dynamic load data from data related to distributed assets in the power network and modify the load forecast based on the dynamic load data for profiling the dynamic load.

According to another aspect of the invention, a method for dynamic load profiling of plug-in electric vehicles (PEVs) in a power network is described. The method can include receiving static load data in the power network, generating a load forecast from the static load data, predicting and generating dynamic load data from data related to the PEVs in the power network and modifying the load forecast based on the dynamic load data for profiling the PEVs.

According to another aspect of the invention a computer program product for dynamic load profiling of plug-in electric vehicles (PEVs) in a power network is described. The computer program product includes a computer readable medium having instructions for causing a computer to implement a method, the method including receiving static load data in the power network, generating a load forecast from the static load data, predicting and generating dynamic load data from data related to the PEVs in the power network and modifying the load forecast based on the dynamic load data for profiling the PEVs.

According to another aspect of the invention a system for dynamic load profiling of plug-in electric vehicles (PEVs) is described. The system can include a processor configured to receive static load data in a power network, generate a load forecast from the static load data, predict and generate dynamic load data from data related to PEVs in the power network and modify the load forecast based on the dynamic load data for profiling the PEVs.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
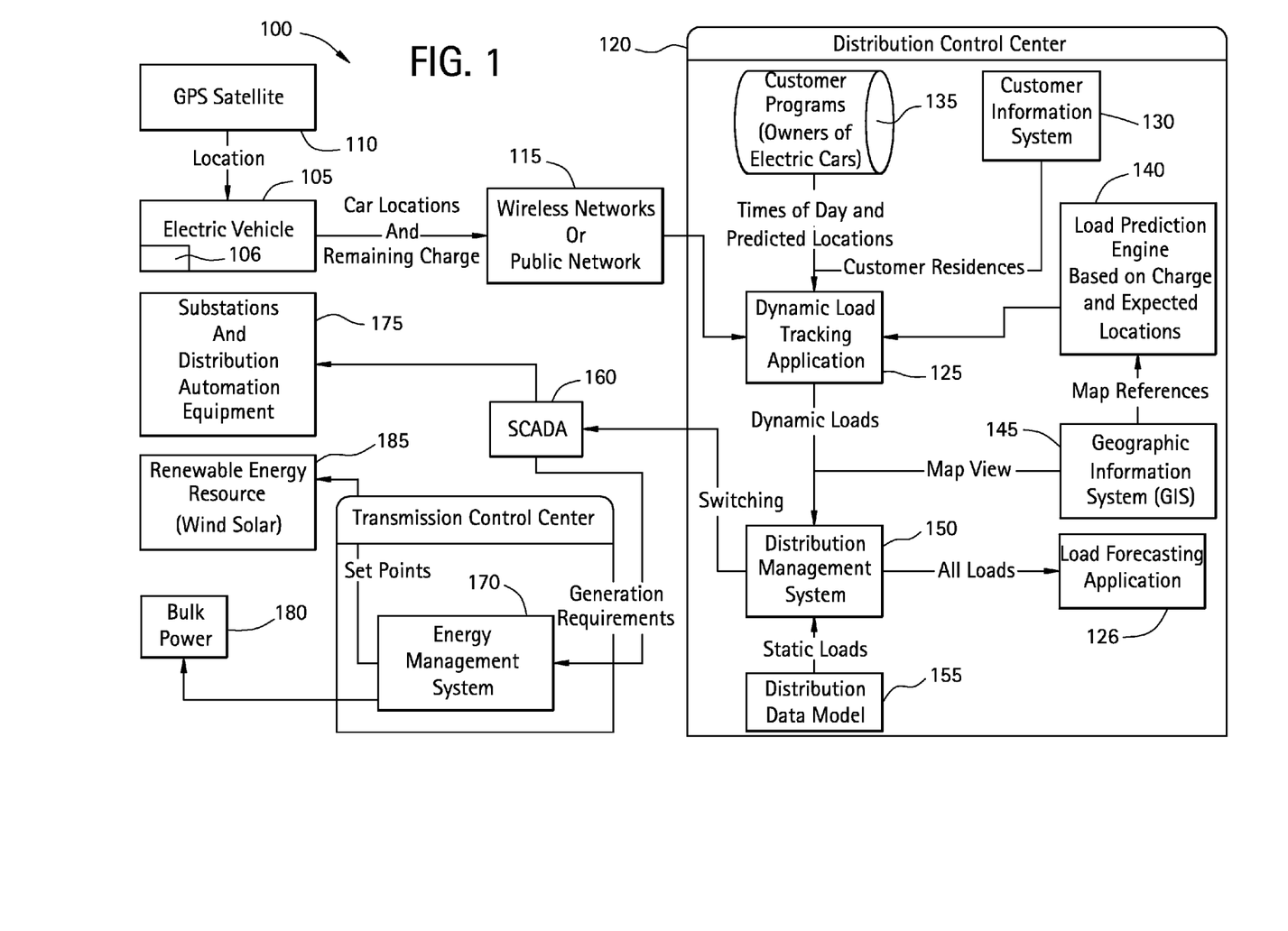
FIG. 1 illustrates an exemplary system for time-based or dynamic load profiling.

FIG. 1 illustrates an exemplary system 100 for time-based or dynamic load profiling. As described herein the system 100 enables tracking and predicting locations of dynamic or moving objects within a distributed power network in order to predict, forecast, and profile distribution load. Although PEVs are discussed as an illustrative example of a distributed asset, it is to be appreciated that any distributed asset that can affect power distribution are contemplated in other exemplary embodiments. Other distributed assets can include but are not limited to larger mass transportation vehicles or any other asset that implemented a battery that could be charged in a charging station on a power network. The specification will refer to the distributed asset as a PEV for exemplary purposes only, and it is not intended to limit the invention in any manner.

In exemplary embodiments, the system 100 includes a PEV (i.e., distributed asset) 105, which can include a global positioning system (GPS) 106 therein. The GPS 106 in the PEV 105 can be in communication with a GPS satellite 110 that can keep track of the location of the PEV 105. The GPS 106 can be communicatively coupled to a wireless or public network 115 to which the GPS 106 can download the location information for the PEV 105. In exemplary embodiments, the PEV 105 can further include other onboard equipment that can keep track of the PEV's onboard distributed load data such as remaining charge in the PEV's battery. This onboard distributed load data can further be uploaded to the network 115. Such onboard equipment is described further herein. As such, the system 100 supports tracking of the location of major mobile electrical loads (i.e., of PEV 105), associating remaining charge with speed and direction in predicting the destination of the PEV, predicting the impact the distributed asset will have on load draws in a specific section of the grid at its destination, and adjusting generation, voltage levels, and volt amps reactive (VARs) to meet that prediction.

The system 100 can further include a distribution control center 120 that can receive the continuous feed of information from the network 115, which includes onboard distributed load data from the PEV 105 as well as other distributed assets. The distributed load data from the PEV 105 can be fed into a dynamic load tracking application 125. In exemplary embodiments, the application 125 can include several modules and functions and can be distributed across the system 100 as described further herein. In exemplary embodiments, the application 125 can include algorithms that predict, based on current location, statistical data of past destinations, registered places of residence and work, remaining charge, speed, manually entered intended destinations, the future location of the PEV 105, when and where the PEV 105 will need a charge and for how long. As such, the system 100 can include registration information of the owner of the PEV 105. Basic information about the owner, such as locations of the residence and workplace, the times of day they will be using the PEV, and the time/distance the PEV 105 can travel before needing a charge, can be collected at the time of purchase of the PEV or at any time the owner wishes to enroll in a program that utilizes such information. It is to be appreciated that this information can be voluntary and held confidential. The information can be collected by dealers, private retailers, or the utility and uploaded to a customer information system 130 to which the distribution control center 120 has access. The times of day that a PEV 105 is used and predicted locations based on original information provided by customers as well as updated information based on data collected from the GPS satellite 110 can be stored in a customer program database 135.

In exemplary embodiments, the application 125 can therefore update the statistical data on where the PEV is located at certain times of the day. Both the customer information system 130 and the customer program database 135 can be communicatively coupled to the application 125. In exemplary embodiments, the application 125 can therefore aggregate prediction data for all PEVs in a distribution network area and generate a predicted (forecasted) draw of power based on the dynamic loads. This prediction is added to existing or new algorithms that are predicting load for static nodes at the same location(s) using load flow algorithms known in the art. As such, the algorithms implemented by the application 125 can be dynamically updated based on collected data over time. The system 100 can therefore also include a load prediction engine 140 that is based on charge, speed, discharging attributes of the dynamic asset, and expected locations of the PEV 105. The engine 140 can therefore help update algorithms in the application 125 over a range of locations at given times. A geographic information system (GIS) 145 can provide map references to the engine 140 to predict where loads will be located and predict geographic areas where dynamic load concentrations will be highest at a given time. The GIS 145 can also be updated and accessed by planners to determine where future charging stations will be needed, based on updated load information from the system 100 over time.

In exemplary embodiments, the system 100 can further include a distribution management system (DMS) 150 that can be interface with the GIS 145, the engine 140 and the application 125. The DMS 150 is similar to a DMS as known in the art, which determines how power is distributed. The DMS 150 does not change the amount of power that is distributed, but rather how it is distributed. As such, the DMS is provided with data from the application 125 to instruct the DMS 150 how power distribution may need to be altered based on the distributed assets. As described herein, the application 125 can be distributed and include several modules such as a load forecasting application 126 that forecasts and communicates the expected total load to external applications such as the DMS 150. The DMS 150 can also be interfaced with static load information as conventionally known in the art. The static load information can be provided from a known distribution data model 155. As such, the DMS can be advantageously provided with both known static load information from the distribution data model and dynamic load data from distributed assets provided by the application 125 (including any additional modules such as application 126). The DMS 150 can then in turn provide changing distribution data to power sources. In exemplary embodiments, the DMS 150 is coupled to system control and data acquisition (SCADA) 160. As known in the art, the SCADA 160 monitors power distribution and control. The dynamic and static distribution from the DMS 150 can be provided to a transmission control center 165 that includes an energy management system (EMS) 170. As known in the art, the EMS 170 can change the amount of power, if necessary, to accommodate increased power needs. In exemplary embodiments, the application 125 can therefore provide data that can also aid the EMS 170 to make determinations whether increased power is required based on both static and dynamic loads. In addition, the DMS 150 can provide distribution instructions to the EMS 170 as well as directly to substations and distribution automation equipment and directly to power sources such as bulk power plants 180, renewable energy sources 185 or other power sources that can include demand response applications, and load shedding applications. As such, the application 125 can formulate a power dispatch plan based on the needed load, voltages, and volt amps reactive (VARs) as communicated to or calculated by the DMS 150.

In exemplary embodiments, the applications 125, 126 prioritize which assets (e.g., the PEV 105) are charged on the power network at given times. If the system 100 discovers that many loads will need to be serviced in a particular areas, and a local storage battery is implemented to provide some of the load, this information could be provided to a the DMS and the charging for the load could be moved up in priority.

Figure 2:
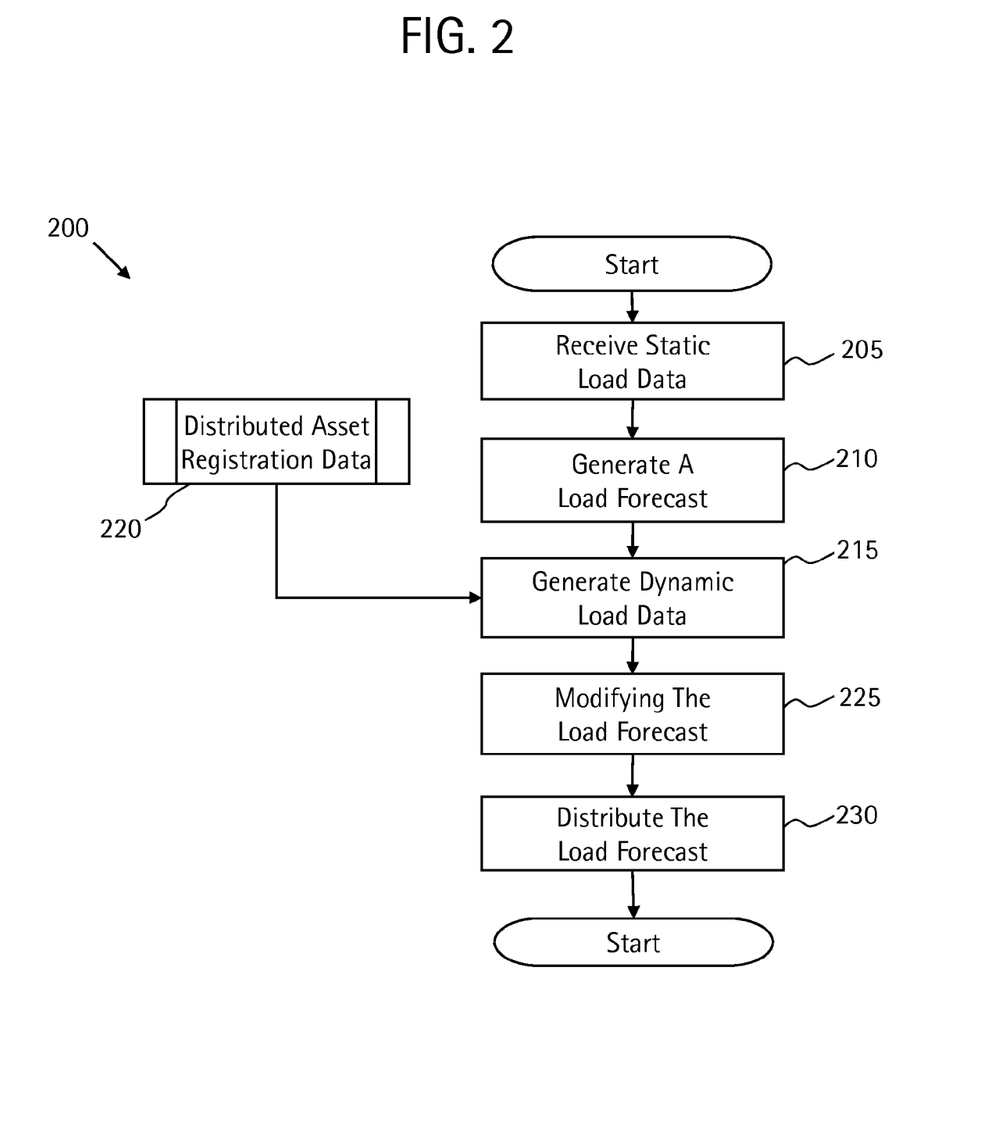
FIG. 2 illustrates a flowchart of a method for dynamic load profiling in accordance with exemplary embodiments.

FIG. 2 illustrates a flowchart of a method 200 for dynamic load profiling in accordance with exemplary embodiments. At block 205, the system 100 can receive static load data in a power network. As described above, the normal and current states of static load data and switchable assets can be stored in the distribution data model 155, based on known static loads in a power network. At block 210, the DMS 150 can generate a load forecast. In exemplary embodiments, the system 100 can further generate dynamic load data related to distributed assets (e.g., the PEV 105) present on the power network at block 215. As described herein, the dynamic load data can be generated based on predicted locations, destinations, and resulting load requirements of the distributed assets. The predictions can be made based on the distributed asset registration data at block 220 combined with the dynamic data received continuously. As described herein, for the example of the PEV 105, an owner can provide information including, but not limited to, residence and work locations, times the PEV 105 is expected to be on the road and how long. As described herein, the registration data provides the system 100 with a proactive approach to predicting where the PEV 105 is located on the power network at given times. If a person has a very set and consistent schedule from day to day, then any location throughout the day could be "scheduled" into the system 100 along with the statistics for the PEV 105. This approach provides a repeatable baseline expectation for loads for every registered PEV in the power network throughout the day. This proactive approach could be augmented by statistically analyzing a GPS log in the PEV 105 for probabilities where a most likely location on days of the week is used as a day or week ahead estimate for a "most likely" load distribution on the power network. The real time information can also be implemented to modify the baseline, which can provide potential performance improvements because the proactive baseline is where users should be located, and is adjusted with where people actually are located. In exemplary embodiments, the entire network could be updated periodically based on real time data. For all locations on the distribution network, the applications 125, 126 plan for near-term load requirements on charging stations. As such, areas of load convergence would be highlighted in the system 100 as more PEVs approach an area. These charging stations thus plan for that load and be flagged in the DMS 150.

In exemplary embodiments, the initial distributed asset registration data can be used to generate an initial prediction of where the PEV 105 will be in the power network during times the owner is at home or at work, and what its load requirements will be at given locations and times. The application 125 can receive the registration information from the CIS 130 and initial prediction from the customer programs 135. In addition, the engine 140 and CIS 130 can input further data into the application to generate destination predictions based on remaining charge, discharge rate, direction, speed, and a predicted radius of remaining travel possible. At block 225, the DMS 150 can then make modifications to the load forecast as well as distribution recommendations as it receives the dynamic load data. In exemplary embodiments, over time, the network 115 receives information related to actual car locations and onboard distributed load data such as remaining charge in the PEV's battery. This information is also uploaded to the application 125, which can then generate improved predictions based on actual data. These improvements can be made over extended periods such as weeks, months and years. But these improvements can also be made over shorter time periods so that the DMS 150 can provide improved power distribution recommendations on a daily basis. As such, the determination of dynamic load data is an iterative process that includes receiving new data about new distributed assets in the power network, and updated data for existing distributed assets in the power network. Regardless, at block 230, the DMS 150 distributes the load forecast to the SCADA 160 substations and distribution automation equipment 175 and transmission control center 165.

In exemplary embodiments, the system 100 can include one or more computing systems or processors to manage the application 125 as well as other components of the system 100. In addition, other processor types have been discussed herein, including onboard equipment on the PEV 105. The processors described herein can be any suitable processor as now described.

Figure 3:
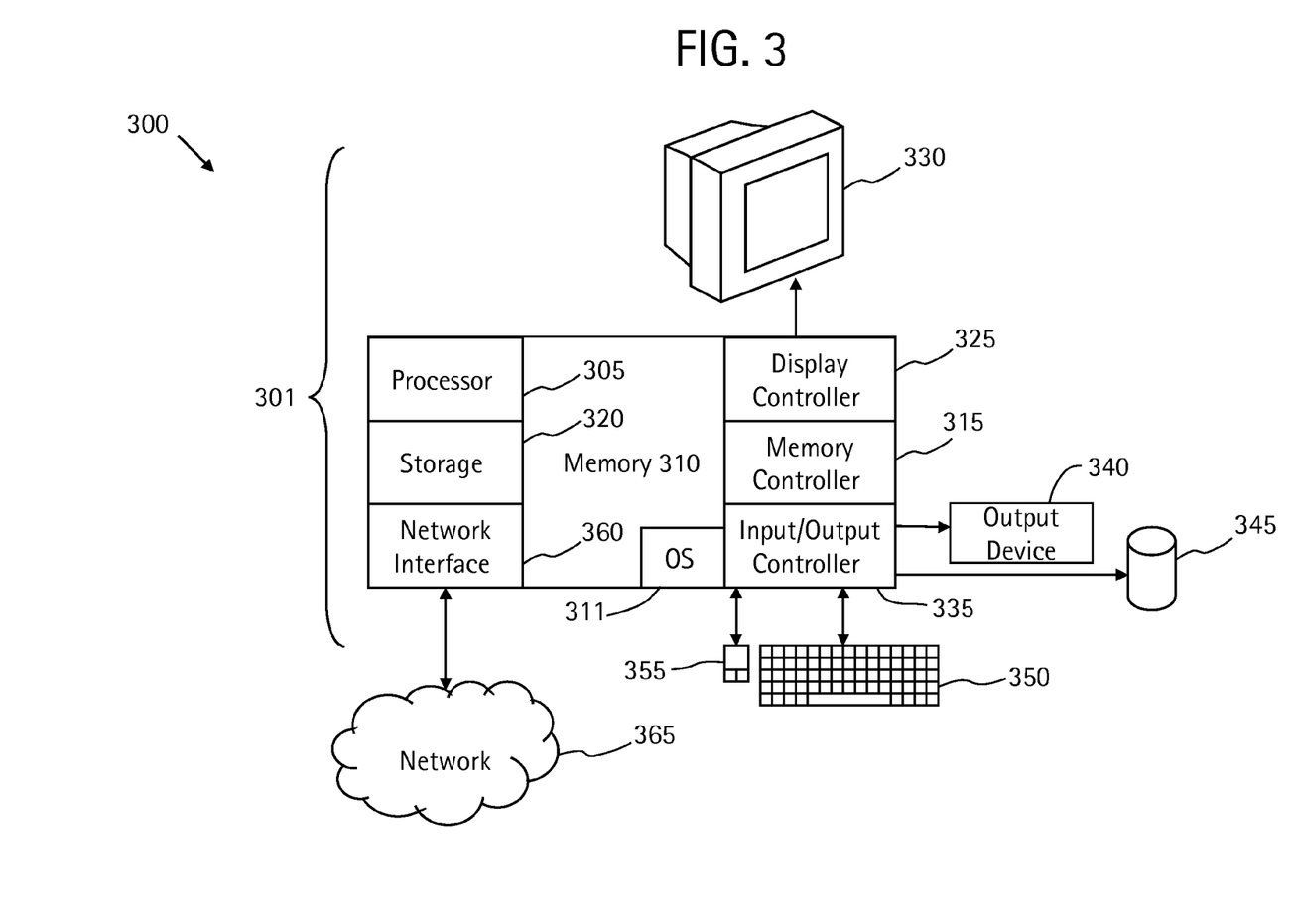
FIG. 3 illustrates an exemplary embodiment of a processor system for a dynamic load profiling.

FIG. 3 illustrates an exemplary embodiment of a processor system 300 for a dynamic load profiling. The methods described herein can be implemented in software (e.g., firmware), hardware, or a combination thereof In exemplary embodiments, the methods described herein are implemented in software, as an executable program, and is executed by a special or general-purpose digital computer, such as a personal computer, workstation, minicomputer, or mainframe computer. The system 300 therefore includes general-purpose computer 301.

In exemplary embodiments, in terms of hardware architecture, as shown in FIG. 3, the computer 301 includes a processor 305, memory 310 coupled to a memory controller 315, and one or more input and/or output (I/O) devices 340, 345 (or peripherals) that are communicatively coupled via a local input/output controller 335. The input/output controller 335 can be, but is not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 305 is a hardware device for executing software, particularly that stored in memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing software instructions.

The memory 310 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The software in memory 310 may include one or more separate programs, each of which comprises an ordered listing of executable instructions for implementing logical functions. In the example of FIG. 3, the software in the memory 310 includes the dynamic load profiling methods described herein in accordance with exemplary embodiments and a suitable operating system (OS) 311. The OS 311 essentially controls the execution of other computer programs, such the dynamic load profiling systems and methods as described herein, and provides scheduling, input-output control, file and data management, memory management, and communication control and related services.

The dynamic load profiling methods described herein may be in the form of a source program, executable program (object code), script, or any other entity comprising a set of instructions to be performed. When a source program, then the program needs to be translated via a compiler, assembler, interpreter, or the like, which may or may not be included within the memory 310, so as to operate properly in connection with the OS 311. Furthermore, the dynamic load profiling methods can be written as an object oriented programming language, which has classes of data and methods, or a procedure programming language, which has routines, subroutines, and/or functions.

In exemplary embodiments, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In exemplary embodiments, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In exemplary embodiments, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the software in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute software stored within the memory 310, to communicate data to and from the memory 310, and to generally control operations of the computer 301 pursuant to the software. The dynamic load profiling methods described herein and the OS 311, in whole or in part, but typically the latter, are read by the processor 305, perhaps buffered within the processor 305, and then executed.

When the systems and methods described herein are implemented in software, as is shown in FIG. 3, the methods can be stored on any computer readable medium, such as storage 320, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the dynamic load profiling methods are implemented in hardware, the dynamic load profiling methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects include improvements in load forecasting accuracy for power networks that include distributed assets such as but not limited to PEVs. The accuracy transfers to more effective usage of available power available by improved distribution plans from the DMS, and potential reductions in spinning reserves from the EMS.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for dynamic load profiling in a power network, the method comprising:
   receiving static load data in the power network;
   generating a load forecast from the static load data;
   receiving distributed load data from distributed assets to generate current and predicted dynamic load data;
   predicting and generating dynamic load data from data related to distributed assets in the power network based on predicting locations of the distributed assets in the power network; and
   modifying the load forecast based on the dynamic load data for profiling the dynamic load data, wherein generating dynamic load data comprises receiving distributed asset registration data, predicting the locations of the distributed assets from the distributed asset registration data, and predicting load requirements of the distributed assets from the asset registration data.

2. The method as claimed in claim 1 wherein the distributed registration data includes predetermined location data for the distributed assets.

3. The method as claimed in claim 1 wherein the distributed asset registration data includes times of day of predetermined locations and time predictions of connections to the power network.

4. The method as claimed in claim 1 further comprising generating a power dispatch plan.

5. The method as claimed in claim 4 wherein the power dispatch plan includes a state of the power network and load demand locations in the power network in order to determine distribution of power.

6. The method as claimed in claim 4 wherein the power dispatch plan includes a state of the power network and load demand locations in the power network in order to determine modifying an amount of power in the power network.

7. A computer program product for dynamic load profiling in a power network, the computer program product including a non-transitory computer readable medium having instructions for causing a computer to implement a method, the method comprising:
   receiving static load data in the power network;
   generating a load forecast from the static load data;
   receiving distributed load data from distributed assets to generate current and predicted dynamic load data;
   predicting and generating dynamic load data from data related to distributed assets in the power network based on predicting locations of the distributed assets in the power network; and
   modifying the load forecast based on the dynamic load data for profiling the dynamic load data, wherein generating dynamic load data comprises receiving distributed asset registration data, predicting the locations of the distributed assets from the distributed asset registration data, and predicting load requirements of the distributed assets from the asset registration data.

8. The computer program product as claimed in claim 7 wherein the distributed registration data includes predetermined location data for the distributed assets.

9. The computer program product as claimed in claim 7 wherein the distributed asset registration data includes times of day of predetermined locations and time predictions of connections to the power network.

10. The computer program product as claimed in claim 7 further comprising generating a power dispatch plan.

11. The computer program product as claimed in claim 10 wherein the power dispatch plan includes a state of the power network and load demand locations in the power network in order to determine distribution of power.

12. The computer program product as claimed in claim 10 wherein the power dispatch plan includes a state of the power network and load demand locations in the power network in order to determine modifying an amount of power in the power network.

13. A system for dynamic load profiling, the system comprising:
   a processor configured to:
      receive static load data in a power network;
      generate a load forecast from the static load data;
      receive distributed load data from distributed assets to generate current and predicted dynamic load data;
      predict and generate dynamic load data from data related to distributed assets in the power network based on predicting locations of the distributed assets in the power network; and
      modify the load forecast based on the dynamic load data for profiling the dynamic load, wherein the processor is further configured to receive distributed asset registration data, predict the locations of the distributed assets from the distributed asset registration data, and predict load requirements of the distributed assets from the asset registration data.

14. The system as claimed in claim 13 wherein the distributed registration data includes at least one of predetermined location data for the distributed assets, times of day of predetermined locations and time predictions of connections to the power network.

* * * * *

UNITED STATES PATENT AND TRADEMARK OFFICE
CERTIFICATE OF CORRECTION

PATENT NO. : 8,712,595 B2
APPLICATION NO. : 13/008097
DATED : April 29, 2014
INVENTOR(S) : McMullin It is certified that error appears in the above-identified patent and that said Letters Patent is hereby corrected as shown below:

On the Title Page

On Page 2, in item (56), under "OTHER PUBLICATIONS", in Column 2, Line 28, delete "Systemems," and insert -- Systems, --, therefor.

In the Drawings

Delete drawing sheet 2 of 3 and substitute the attached sheet 2 of 3, therefor.

In the Specification

In Column 2, Line 33, delete "profiling;" and insert -- profiling. --, therefor.

In Column 6, Line 4, delete "thereof" and insert -- thereof. --, therefor.

Signed and Sealed this
Twenty-third Day of September, 2014

Michelle K. Lee
*Deputy Director of the United States Patent and Trademark Office*

FIG. 2